(12) United States Patent
Koo et al.

(10) Patent No.: US 6,889,040 B1
(45) Date of Patent: May 3, 2005

(54) SERVICE RESTRICTION CONTROL FOR MOBILE COMMUNICATIONS

(75) Inventors: Yuen-Yin L. Koo, Morristown, NJ (US); Eshwar Pittampalli, Randolph, NJ (US); David Albert Rossetti, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 570 days.

(21) Appl. No.: 09/686,024

(22) Filed: Oct. 11, 2000

(51) Int. Cl.⁷ ............................................. H04Q 7/20
(52) U.S. Cl. ................... 455/418; 455/414.1; 455/420; 455/450; 370/466
(58) Field of Search ................. 455/70, 403, 414, 455/418, 426, 434, 450, 466, 552, 419, 420; 370/329, 341, 466, 469, 395.5, 395.52; 375/220

(56) References Cited

U.S. PATENT DOCUMENTS

| | | | |
|---|---|---|---|
| 5,590,397 A | * 12/1996 | Kojima | 455/417 |
| 5,924,026 A | * 7/1999 | Krishnan | 455/414.1 |
| 5,930,264 A | * 7/1999 | Nguyen | 370/466 |
| 6,128,490 A | * 10/2000 | Shaheen et al. | 455/434 |
| 6,157,835 A | * 12/2000 | Findikli et al. | 455/436 |
| 6,173,181 B1 | * 1/2001 | Losh | 455/434 |
| 6,188,898 B1 | * 2/2001 | Phillips | 455/433 |
| 6,389,298 B1 | * 5/2002 | Abramovici et al. | 455/552.1 |
| 6,438,375 B1 | * 8/2002 | Muller | 455/435.3 |
| 6,539,030 B1 | * 3/2003 | Bender et al. | 370/469 |
| 2001/0029178 A1 | * 10/2001 | Criss et al. | 455/419 |

FOREIGN PATENT DOCUMENTS

| | | | |
|---|---|---|---|
| EP | 1 041 848 A | 10/2000 | H04Q/7/38 |
| WO | WO 00 52948 A | 9/2000 | H04Q/7/38 |

OTHER PUBLICATIONS

European Search Report.

* cited by examiner

*Primary Examiner*—William Trost
*Assistant Examiner*—James Ewart

(57) ABSTRACT

The possibility of incompatibility between wireless communication system stations having the most recent protocol revisions is addressed by transmitting from the base station to a mobile station characteristics that identify a mobile station group that is restricted to using less than the most recent protocol revision. Using less than the most recent protocol revision may involve using an earlier revision or a subset of the most current protocol revision. This permits a base station to direct mobiles to avoid using protocol revisions or features of protocol revisions that have been insufficiently tested or that have a history of problems for a particular base station/mobile station combination.

Additionally, when a mobile station receives a message from a base station identifying which mobile stations are subject to what set of restrictions, the mobile station then sends a message to the base station requesting service that matches the restrictions that were identified associated with the group to which the mobile station belongs.

5 Claims, 2 Drawing Sheets

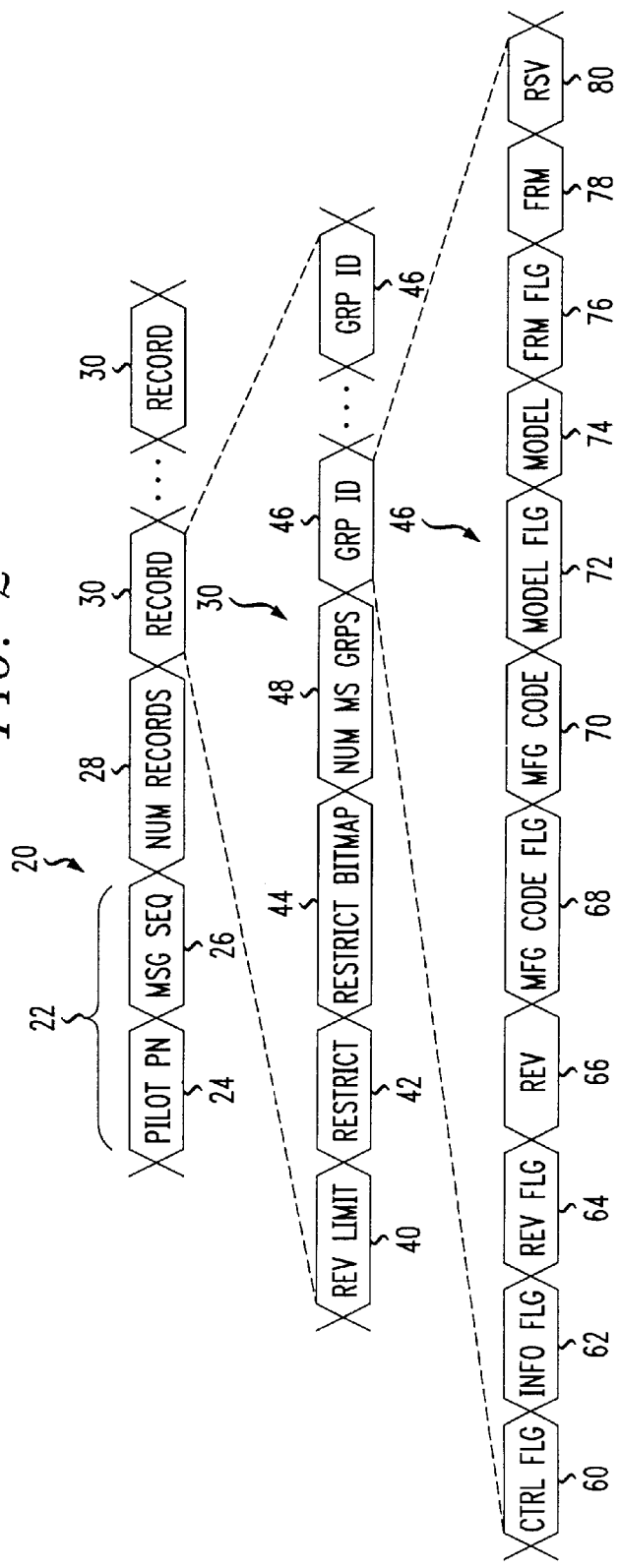

SERVICE RESTRICTION CONTROL FOR MOBILE COMMUNICATIONS

BACKGROUND OF THE INVENTION

1. Field of the Invention

The present invention relates to communications; more specifically, mobile communications.

2. Description of the Related Art

As advancements in technology become available, more advanced service capabilities are provided to base stations and mobile stations. These capabilities are provided through the use of updates that are typically referred to as protocol revisions. The protocol revisions may be to either hardware and/or software and are typically given a number for reference purposes. As these new protocol revisions are integrated into the communication system it is possible for the protocol revision level of a particular mobile station and base station to be mismatched. When this occurs, the base station and mobile station communicate their most current protocol revision level to each other and agree to communicate using the most recent protocol revision that is common to both stations.

As new protocol revisions are integrated into the communication system, it is possible for a base station and mobile station that both have the most current protocol revisions to be incompatible because of, for example, a lack of testing, oversight or haste in introducing the latest revisions. As a result, this incompatibility between current protocol revisions may result in failed communication and customer dissatisfaction.

SUMMARY OF THE INVENTION

The present invention addresses the possibility of incompatibility between wireless communication system stations having the most recent protocol revisions by transmitting from a base station to a mobile station characteristics that identify a mobile station group that is restricted to using less than the most recent protocol revision. Using less than the most recent protocol revision may involve using an earlier protocol revision or a subset of the most current protocol revision. This permits a base station to direct mobiles to avoid using protocol revisions or features of protocol revisions that have been insufficiently tested or that have a history of problems for a particular base station/mobile station combination.

Additionally, when a mobile station receives a message from a base station identifying which mobile stations are subject to which set of restrictions, the mobile station then sends a message to the base station requesting service that matches the restrictions that were associated with the group to which the mobile station belongs.

BRIEF DESCRIPTION OF THE DRAWINGS

FIG. 2 illustrates a service restriction message transmitted by a base station; and FIG. 3 illustrates a service request message transmitted by a mobile station.

DETAILED DESCRIPTION OF THE INVENTION

Figure 1:
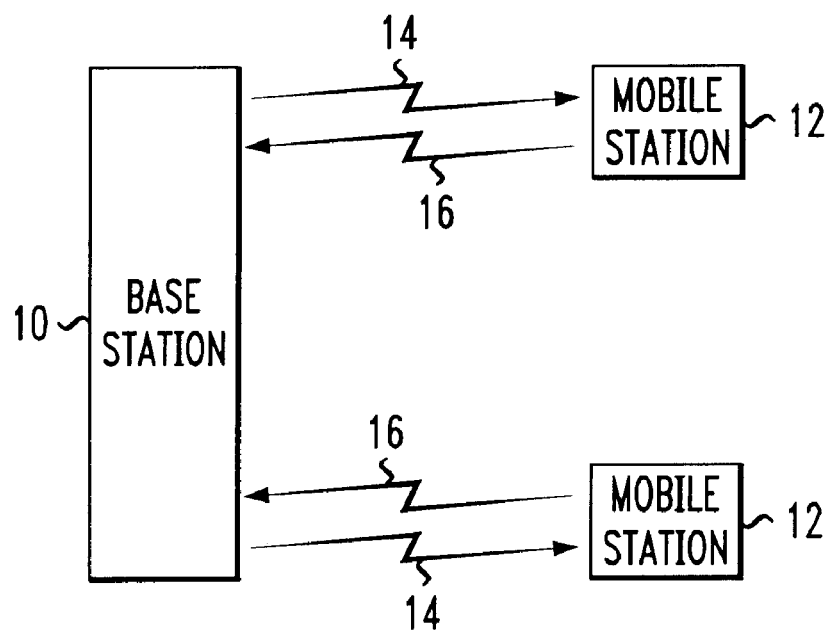
FIG. 1 illustrates communication links between a base station and mobile stations.

FIG. 1 illustrates communications between base station 10 and mobile stations 12. Base station 10 transmits to mobile station 12 using a downlink broadcast communication channel such as communication channel 14. Each of mobile stations 12 communicate with base station 10 using an uplink communication channel such as access channel 16.

FIG. 2 illustrates a service restriction message that is transmitted from base station 10 to mobile stations 12. The message may be transmitted over a downlink channel such as a broadcast control channel. The message contains mobile station characteristics that identify a mobile station group that is restricted to using less than the most recent protocol revision. Using less than the most recent protocol revision may involve using an earlier protocol revision, a subset of an earlier protocol revision or a subset of the most current protocol revision.

Message 20 comprises header section 22. Header section 22 includes information that assists a mobile station in obtaining communication services. For example, in the case of a CDMA (Code Divisional Multiple Access) system header 22 includes pilot offset portion 24 and message sequence number 26. Pilot offset portion 24 may be 9 bits long and specifies a timing offset associated with a pilot used by the base station transmitting the message. Message sequence 26 which may be 6 bits long and simply provides a numerical reference for the message. The remaining portion of message 20 includes number of record portions 28 and record portions 30. The number of record portions may be 3 bits long and indicates the quantity of record portions 30 that are contained in message 20.

Record portion 30 includes revision limit portion 40 that may be 8 bits long and specifies the latest revision number that a mobile may us use when communicating with the base station. Service restriction flag 42 may be 1 bit long and indicates whether there are service restrictions associated with the revision limit specified in portion 40. Restriction bit map portion 44 may be 8 bits long and indicates which services or features associated with the limit of portion 40 are not available for use by a mobile station to be identified by group ID portion 46. The number of mobile station groups portion 48 indicates the quantity of group ID portions 46 that are associated with record 30 and that will be subjected to the restrictions specified by portion 44.

Group ID portion 46 comprises control flag portion 60 which may be 1 bit long. Control flag portion 60 may be set to 0 if the restrictions of portion 44 are to apply to the mobile station group identified by group ID portion 46. This flag may be set to 1 to indicate that the mobile station group identified by group ID portion 46 is an exception to the restrictions specified by portion 44. Mobile station identification information including flag portion 62 may be 1 bit long. If control flag portion 60 is set equal to 1, portion 62 is set equal to 1 to indicate that protocol ID portion 46 will include information identifying mobile stations that are exempt from the restrictions of portion 44. If control flag portion 60 is set equal to 0, portion 62 is set equal to 0 if the restrictions of portion 44 is to apply to all mobile stations, otherwise portion 62 is set equal to 1 to indicate that information will be provided to identify mobile stations that are subject to the restrictions of portion 44.

Mobile protocol revision included flag 64 may be 1 bit long. This flag is set equal to 1 when protocol ID portion 46 includes mobile station protocol revision information to identify a mobile station or group of mobile stations. Mobile station protocol revision portion 66 may be 0 or 8 bits long. Portion 66 is included when the flag of portion 64 is equal to 1 and portion 66 is not included when the flag of portion 64 is set equal to 0. Mobile station manufacturer code included flag portion 68 may be 1 bit long. When set to 1, portion 68 indicates that group ID portion 46 includes manufacturer code information to identify a mobile station or group of mobile stations. Manufacturer code portion 70 may be 0 or 8 bits long and is used to indicate a manufacturer of the mobile station that is being identified by group ID portion 46. Portion 70 is included when the flag of portion 68 is equal to 1 and portion 70 is not included when the flag of portion 68 is set equal to 0.

Mobile station model information included flag portion 72 may be 1 bit long. When set to 1, portion 72 indicates that group ID portion 46 includes model information to identify a mobile station or group of mobile stations. Model information portion 74 may be 0 or 8 bits long and is used to indicate the model of the mobile station that is being identified by group ID portion 46. Portion 74 is included when the flag of portion 72 is equal to 1 and portion 74 is not included when the flag of portion 72 is set equal to 0.

Mobile station firmware revision information included flag portion 76 may be 1 bit long. When set to 1, portion 76 indicates that group ID portion 46 includes firmware revision information to identify a mobile station or group of mobile stations. Firmware revision information portion 78 may be 0 or 8 bits long and is used to indicate the firmware revision information of the mobile station that is being identified by group ID portion 46. Portion 78 is included when the flag of portion 76 is equal to 1 and portion 78 is not included when the flag of portion 76 is set equal to 0.

An additional message portion 80 may be included for reserve purposes such as additional mobile station identifying information.

FIG. 3 illustrates message 100 that is transmitted from mobile station 12 to base station 10 using an uplink communication path 16 such as an access channel. Message 100 includes header portion 110, ID portion 112 and service restriction bit map portion 114. Header portion 110 contains information that enables base station 10 to begin reception of message 100 and may be, for example, a pilot signal. ID portion 112 identifies the mobile station communicating with the base station and may include information such as the mobile station's electronic serial number. Message portion 114 includes the service restriction bit map associated with the mobile transmitting message 100. The service restriction bit map of portion 114 may be the same as the bit map that was included in portion 44 of message 20 which was received by the mobile station from base station 110.

The invention claimed is:

1. A method for controlling communication services, said communication services including a base station transmitting messages to, and receiving messages from, at least one mobile station, the method comprising by the steps of:

transmitting from the base station to the at least one mobile station a message identifying which mobile stations are restricted to using a constrained protocol representing something less than the most recent protocol revision, the constrained protocol being an earlier protocol revision or a subset of the most recent protocol revision; and providing communication services to the one or more mobile stations identified in the message subject to the constrained protocol.

2. The method of claim 1, wherein the message identifies a group of mobile stations.

3. The method of claim 1, wherein:

the message is a first message; and the method further comprises the step of:

receiving at the base station from one or more of the restricted mobile stations a second message requesting service from the base station subject to the constrained protocol.

4. The method of claim 1, wherein, if the message identifies the constrained protocol as being a subset of the most recent protocol revision, then the message further includes a flag indicating that there are restrictions as to services otherwise available with the most recent protocol, and a map portion indicating which of the services are not available to the one or more mobile stations.

5. A method for controlling communication services, said communication services including a base station transmitting messages to, and receiving messages from, at least one mobile station, the method comprising the steps of:

receiving a first message at a mobile station, the received message identifying which mobile stations are restricted to using a constrained protocol representing something less than the most recent protocol revision, the constrained protocol being an earlier protocol revision or a subset of the most recent protocol revision; and transmitting, if the first message identifies the mobile station, a second message from the mobile station requesting communication services subject to the constrained protocol.

* * * * *